July 11, 1961  R. W. McKINLEY ET AL  2,991,497
FEATHER PICKING MACHINE

Filed May 31, 1956  4 Sheets-Sheet 1

INVENTORS.
Robert W. McKinley.
BY J. Howard Ernstes.
Wood, Herron & Evans.
ATTORNEYS.

United States Patent Office 2,991,497
Patented July 11, 1961

2,991,497
FEATHER PICKING MACHINE
Robert W. McKinley and Joseph Howard Ernstes, Greensburg, Ind., assignors to The Ashley Machine Company, Greensburg, Ind., a corporation of Indiana
Filed May 31, 1956, Ser. No. 588,328
12 Claims. (Cl. 17—11.1)

This invention relates to industrial poultry dressing equipment and is directed to a batch-type machine for stripping the feathers from poultry after the birds have been killed and scalded.

In the past, feather stripping or picking was done largely by hand and involved dipping the killed birds in a scald bath, then plucking the feathers manually from the individual birds. These tedious hand operations, particularly plucking, involved substantial labor costs which naturally were reflected in the market price of dressed poultry.

More recently, the industry has turned to mechanical picking apparatus of the type disclosed in Patent No. 2,300,157, issued to George R. Hunt on October 27, 1942. Essentially, the Hunt machine consists of a rotating drum carrying a number of flexible picking fingers projecting outwardly from its periphery. The bird is presented to the rotating fingers, which by a rubbing action, pluck the feathers rapidly and cleanly and in the fraction of the time required in hand picking. The Hunt principle is utilized in a manual machine in which each bird is held individually against the fingers of the drum and turned about until the feathers are removed from all parts.

In the larger plants, automatic machines having the same principle are utilized along a production line. In this case, the birds are suspended from a conveyor and advanced between one or more pairs of rotating picking drums mounted on opposite sides of the advancing poultry, such that the fingers frictionally engage the bird from opposite sides and strip the feathers as the poultry advances.

To obtain the best picking action with the manual machine, the operator presents the bird under pressure to the drum and manipulates it to cause the rubber picking fingers to act against, or in a path oblique to the "lay" or disposition of the feathers. The operation of the automatic machine involves attaching each bird individually to the conveyor at one end and removal from its opposite end after treatment. Thus, both classes of machines require individual handling of the poultry.

One of the primary objectives of the present invention has been to increase the speed and efficiency of the feather stripping operation by the provision of a machine which strips the feathers while the birds are confined loosely in batch formation, as distinguished from individual handling, thus making it possible to treat the batches with very little time devoted to handling.

Another objective has been to provide a simple, inexpensive machine which removes the feathers completely and uniformly from all surfaces of the batch during a relatively short period of time, utilizing flexible picking fingers which pass in diverse directions with respect to the lay of the feathers, but without requiring any attention or manipulation by the operator during treatment.

A further objective has been the provision of a universal feather stripping machine, that is, one capable of handling and treating all sizes and kinds of poultry without alteration in the essential components of the machine.

Essentially, a machine for carrying out the principles of this invention comprises an upright stationary cylinder or chamber for confining loosely the batch of poultry, a concentric picking cone mounted for rotation within the chamber, a set of flexible rubber fingers projecting inwardly from the stationary chamber toward the cone, and a second set of fingers projecting outwardly from the cone toward the chamber. The base of the picking cone is slightly smaller than the chamber to delineate an annular space for discharging the plucked feathers from the bottom of the chamber by gravity in the presence of flush streams of water.

Broadly speaking, the stationary chamber coacts with the rotating cone to present each bird of the batch under pressure to the action of the cone fingers, thereby to create the feather stripping action. Concurrently, the stationary fingers of the chamber agitate or manipulate the birds and cause the fingers to move in diverse paths relative to the lay of the feathers. The stripping action, as a consequence of the pressure and tumbling motion, is generally similar to that of the manual machine; however, since the entire batch is treated at the same time, a given number of birds are treated in a fraction of the time.

In its utility as a universal machine, the sloping surface of the cone and its fingers, coacting with the cylindrical wall of the stationary chamber, delineate an annular, downwardly converging feather stripping zone which leads to the restricted discharge passageway. When small birds, such as chickens, are treated, they drop naturally down the converging zone until they reach its lower portion in contact with the chamber of the wall and lower fingers of the cone. Larger birds, such as turkeys, correspondingly occupy a higher plane in the converging zone and are acted upon by the fingers located in a higher plane about the cone.

The concentric cone and cylinder combination has the further advantage of increasing the pressure of the cone fingers against heavier, larger birds, the feathers of which are usually more difficult to strip. This action is brought about by the wedging effect of the cylindrical wall acting against one side of the bird, and the downwardly sloping path of motion of the cone fingers acting against the opposite side. This causes the stripping pressure to respond, at least in part, to the character of the bird. Moreover, even though all the birds of a given batch are not uniform, each bird will naturally be acted upon under a stripping pressure which is related generally to its size and weight.

In operating the machine, the batch of freshly scalded poultry, while still wet, is charged into the open top of the stationary chamber, preferably with the picking cone stationary. Upon rotation of the cone, with birds resting upon and between its fingers, the birds are distributed about the chamber by the advancing fingers, then the fingers, due to the speed of cone rotation, tend to throw the birds outwardly toward the chamber wall by centrifugal force. Since the birds, by their own weight, are in contact with the advancing cone fingers, they tend to move in an orbit within the cylindrical chamber, while their rotational movement is impeded, at least partially, by the stationary fingers which project into the path of motion of the birds. By intercepting the birds, the stationary fingers keep the entire batch in a state of agitation while reducing their orbital motion to a rate which is slow in proportion to the speed of the moving fingers. Therefore, each bird is subjected to a uniform rubbing or stripping action by the advancing cone fingers which pass in all directions with respect to the lay of the feathers.

During rotation of the picking cone, the dislodged feathers eventually reach the surface of the chamber wall then are carried downwardly by flush streams of water for passage through the annular discharge space. This space is sufficiently wide for the passage of the largest outer feathers, but prevents the feet, wings or other parts of the birds from projecting into the space with attendant damage. The flush streams, which are supplied by a manifold at the top of the chamber, also clean the birds of any dirt which they may carry.

The machine disclosed in the drawings is used in plucking chickens, ducks and other fowl; for plucking large turkeys, no change is required except the size of the annular discharge opening usually is increased to accommodate the larger turkey feathers. The rate of cone rotation for the various kinds of poultry is constant; however, the duration of treatment per batch may be changed to suit variable factors. For this purpose, the motor which drives the picking cone, preferably is interconnected with an adjustable timer which regulates the time cycle and controls the supply of flush water through the manifold.

The machine is intended for use in conjunction with a batch scalding machine as disclosed in Patent No. 2,728,938, issued to Robert W. McKinley et al. on January 3, 1956. Since both machines operate through preselected time cycles, one operator may run both of them without a great deal of effort, preferably loading or unloading one machine while the other machine is running through its cycle.

The various features and advantages of the invention are brought out in greater detail in the following description relating to the drawings.

In the drawings:

FIGURE 3 is a top plan view of the machine, with the parts shown in section as viewed along line 3—3 of FIGURE 2.

*General arrangement and operation*

The drawings illustrate the principles of the invention embodied in a machine having a size and capacity best suited to the average processing plant. As explained later, the capacity of the machine illustrated also adapts it for operation with the batch scalding machine of the aforesaid McKinley et al. patent, if the plant is so equipped. However, the invention may be embodied in machines having a larger or smaller size and output capacity, as will be noted from the following description.

In the structure illustrated, the feathers and drainage water discharge by gravity from the lower end of the stationary chamber; hence, the machine is installed upon a suitable drainage surface in the plant, such as a concrete floor having suitable drainage facilities or upon a trough or the like serving the same purpose. It will be understood that the machine may be provided with suitable means for collecting and delivering the discharge mixture through a conduit, if necessary.

Figures 1, 7, 8:
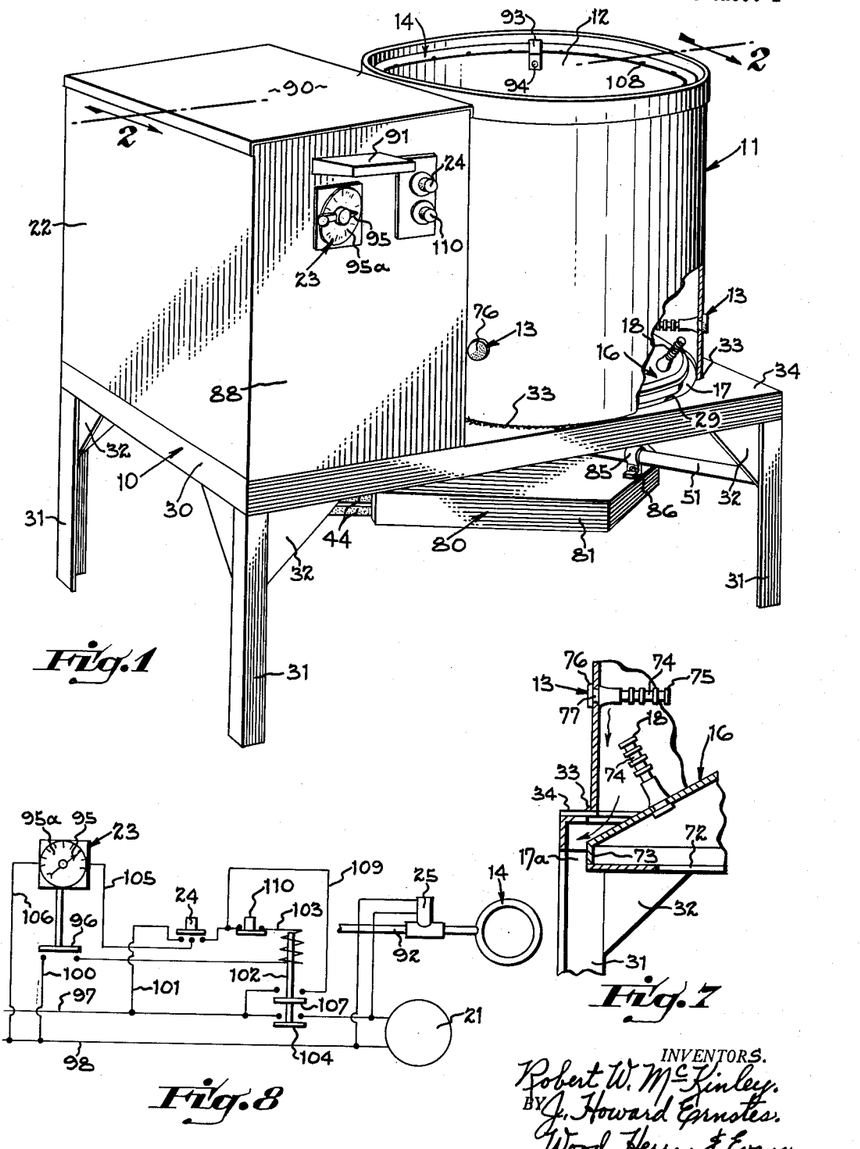
FIGURE 1 is a perspective view of a feather stripping machine constructed according to the present invention.
FIGURE 7 is a fragmentary view similar to FIGURE 5, showing a modified arrangement for regulating the size of the feather discharge opening.
FIGURE 8 is a diagram illustrating the control system of the machine.

Described generally with reference to FIGURE 1, the feather stripping machine comprises a base 10 supporting the upright stationary chamber 11, the batches of poultry being charged directly into the open top 12 of the chamber. The stationary chamber includes in its lower portion a set of stationary agitator fingers 13, in the present instance, consisting of four fingers spaced at 90 degrees apart and projecting radially toward the central vertical axis of the cylindrical chamber. The manifold 14, which supplies the flow streams of flush water, consists of a ring-shaped perforated tube mounted at the upper end of the chamber 11. The manifold is arranged to direct the jet streams of water upon the internal surface of the chamber, about its entire circumference, so as to create a sheet of flowing water which carries the stripped feathers down to the discharge end 17 of the chamber, as indicated by the arrows in FIGURE 2. The water supply is controlled by an electrically operated valve as explained later.

Figures 2, 5, 6:
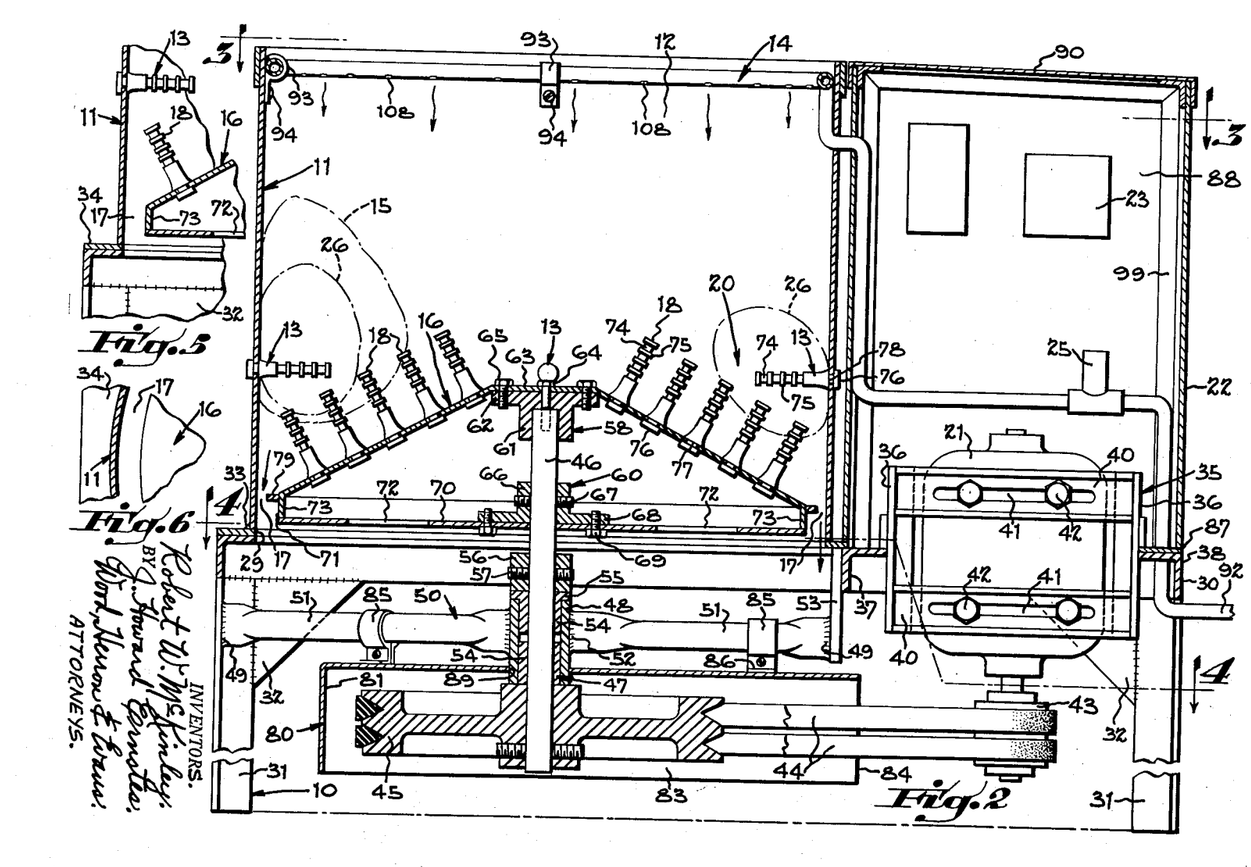
FIGURE 2 is a sectional view of the machine taken along line 2—2 of FIGURE 1.
FIGURE 5 is a fragmentary view showing the rim of the cone removed to increase the size of the feather discharge, adapting the machine to turkey plucking operations.
FIGURE 6 is a fragmentary plan view projected from FIGURE 5, further illustrating the modified arrangement of the cone.

The rotary picking cone or drum 16 is mounted for rotation in the lower portion of chamber 11 with its axis of rotation coaxial with the chamber axis. As best shown in FIGURE 2, the base of cone 16 is sufficiently smaller than the inside diameter of the chamber to delineate the annular passageway 17 for discharging the dislodged feathers and flush water by gravity. The rotating cone is provided with sets of picking fingers 18 which project in a generally radial direction from the axis of rotation of the cone toward the stationary agitator fingers 13. As seen in FIGURE 2, the axes of the picking fingers are normal to the slope of the cone, such that the rotating fingers project upwardly toward the agitator fingers, the axes of which are generally horizontal. The picking fingers 18 of drum 16 are flexible, but have sufficient bending resistance to support the poultry and advance the batch in an orbit within chamber 11. The outer portions of the fingers 18, as viewed in FIGURE 2, form a downwardly sloping stripping plane which, combined with the wall of chamber 11, createst the downwardly converging feather stripping zone 20. The sloping plane of the advancing fingers 18 and perpendicular wall of the chamber combine to set up a wedging action which increases the stripping action of the fingers as they pass across the surface of the poultry.

The rotating cone is driven by the motor 21 mounted within the housing 22 and connected by a V-belt drive to the cone. As noted earlier, the machine preferably is provided with an automatic control system which regulates the timing of the operation cycles in accordance with the setting of an adjustable timer 23. Each cycle is initiated by depressing the start button 24; in response, the motor is energized to rotate the cone, and an electrically operated valve 25 is opened to supply the flush water to the manifold for timed period according to the timer setting. At the end of the cycle, the timer closes the valve and deenergizes the motor to stop the cone for removal from the chamber of the plucked batch of fowl.

As described later with reference to FIGURE 8, the timer, which is a commercial structure, is of the repeater type which provides the same time without being reset each time the start button is depressed for a cycle.

The machine shown in the drawings, which is highly successful, has a stationary chamber 11 which is approximately 28 inches in diameter and 24 inches high. The picking cone 16 is approximately 27 inches in overall diameter at the base. This provides a discharge passageway 17 approximately ½ inch wide extending around the base of the chamber. It has been found that, utilizing a cone of the indicated diameter, a speed of approximately 300 r.p.m. provides the most efficient feather stripping action. The width of passageway 17 may be increased when treating turkeys, as explained later.

If the plant is processing chickens, the best cycle timing may be determined experimentally, then the successive batches may be treated at the same setting, assuming the chickens to be generally uniform in quality and scald treatment. In actual practice, a machine of the size indicated is capable of handling batches of 10 to 12 freshly scalded chickens with a treatment period of 20 to 30 seconds duration for each batch. When plucking large turkeys, the machine is capable of handling five to six birds per batch with approximately the same timing. As explained later with reference to the control circuit, the machine may be operated under manual control if desired.

When operating under timer of control, the scalded batch of poultry is charged into the chamber, then the start button is depressed to initiate the cycle. As the cone speeds up, centrifugal force throws the birds outwardly toward the wall of the chamber 11 (FIGURE 2) while the rotating picking fingers 18 impel the birds around the converging stripping zone 20. It will be seen in FIGURE 2, that the slope of the cone disposes its fingers in an annular path of motion normal to the slope of the cone. Because of this, the advancing fingers tend to force the birds against the chamber wall, while the wall acts as a backing surface as the fingers advance under pressure across the birds to strip the feathers. This action also tends to impart a rolling motion to the birds. The orbital and rolling motion of the birds is indicated by the arrows 8 and 9 in FIGURE 3.

Larger birds, such as turkeys, are acted upon in the same way by the upper fingers of the cone due to the converging shape of the picking zone. Since the stationary fingers 13 are located in the path of movement, they impede the orbital or rotational movement of the birds and create the tumbling or agitating action.

Both sets of fingers, but particularly the fingers of the cone, yield when forced across the surface of the poultry and strip its feathers by frictional engagement. The picking fingers are spaced about the cone at fairly close intervals (FIGURES 2 and 3) therefore, each bird is subjected to a sustained stripping action as a consequence of the difference in the speed of the tumbling poultry and speed of the cone fingers. Upon being arrested by a stationary finger 13, the poultry usually passes over it, then drops down for re-engagement by the moving fingers, but in a different position, such that the stripping action is resumed in a new direction relative to the lay of the feathers as the poultry intermittently is arrested or impeded. As a consequence, all feathers, regardless of their disposition, eventually are stripped away.

Referring to FIGURE 3, the stationary fingers 13 reside in a plane slightly below the central plane of the mass of poultry and upon intercepting the birds, tend to yield in the direction of motion 8 of the poultry, as indicated at 27. The advancing cone fingers 18 bend in a similar way as they pass across the birds, as indicated at 28 in FIGURE 3.

As shown in FIGURE 2, a larger bird such as a turkey, indicated at 15, resides at a slightly higher plane in the converging stripping zone 20. However, because of its greater weight and increased inertia, it bends the fingers 18 to a somewhat greater extent (with a consequent increase in feather stripping pressure) and thereby finds a plane of rotation in the path of the stationary fingers for agitation in the same manner as the smaller birds.

It will be observed in FIGURE 2, that since the poultry is in contact with the wall of the chamber almost constantly during treatment, the dislodged feathers, which may adhere temporarily, are washed off by the flush streams flowing down the wall from the manifold 14, as indicated by the arrows. In practice, the entire batch of birds is thoroughly cleaned of all feathers, including small pin feathers, within the indicated treatment period of 20 to 30 seconds. By reason of the tumbling action to which the birds are subjected, all parts are thoroughly cleaned even areas under the wings and legs which are difficult to reach.

At the end of the cycle, the timer deenergizes the motor and closes off the water supply. Since most of the larger outside feathers are stripped off first, they will have been flushed away during the first portion of the cycle, the smaller under feathers, and finally the pin feathers, being stripped as the cycle nears its end. During the final stages therefore, the denuded surfaces of the birds are washed by the flush streams of adhering feathers and of any dirt which may adhere after the scald treatment.

Structural details

The base 10 of the machine preferably is of welded construction and consists of a rectangular frame 30 formed of angle irons and supported at the four corners by legs 31. The legs preferably are reinforced by the triangular gussets 32 which are welded in place at the four corners. It will be noted in FIGURE 4, that the angle irons which form the sides of frame 30 are clear of the annular passageway 17. The lower end of the chamber preferably is welded as at 33 directly to the cover plate 34 which forms the top surface of frame 30. The cover plate includes a circular opening 29 in registry with the open lower end of chamber 11 for drainage.

The motor 21 is carried upon a mounting frame 35 consisting of vertical angle irons 36—36 (FIGURE 2) welded to an intermediate cross member 37 and to the end member 38 of the main frame. The motor mounting frame further includes horizontal channels 40—40 welded to the upper and lower ends of the vertical angles 36. The horizontal channels are slotted as at 41, the motor being attached by screws 42 passing through the slots and threaded into its base. This arrangement allows the motor to be shifted for tightening the belt drive.

The V-belt drive consists of the driving sheave 43 of the motor connected by V-belts 44—44 to the large sheave 45 keyed to the shaft 46 of the rotating cone. The picking cone is supported by shaft 46 upon a combined radial and thrust bearing 47 carried in a sleeve 48, as shown in FIGURE 2. Sleeve 48 is supported by the spider 50 (FIGURE 4) consisting of the three tubes 51 which project radially and have flattened inner ends welded to the sleeve as at 52. The outer end of one of the tubes is welded to a plate 53 attached to the intermediate cross member 37; the opposite pair of tubes are welded as at 49 to the legs 31. By this arrangement, the weight load of the cone and the impacts to which it is subjected, are carried directly from the bearing sleeve 48 to the frame of the machine.

As best shown in FIGURE 2, bearing sleeve 48 includes spaced bushings 54—54, the upper bushing having a head 55 seated upon the upper end of the sleeve. The space between the inner ends of the bushings is supplied with lubricant by a standard pressure grease fitting (not shown). The bearing carries the thrust load of shaft 46 by means of a thrust collar 56 locked on shaft 46 by set screws 57, collar 56 being in bearing engagement upon the head 55 of the top bushing.

The cone is mounted upon shaft 46 by upper and lower mounting couplers 58 and 60. Upper coupler 58 comprises a socket 61 fitted upon the upper end of shaft 46 and having a circular flange 62 engaging the flat top 63 of the cone. The coupler is centered upon the shaft by a centering bolt 64. A series of bolts 65, spaced around the circumference of the flange, secures the cone to the circular flange.

The lower coupler 60 comprises a sleeve 66 keyed to shaft 46 by opposed set screws 67—67. The flange 68 of the coupler is secured by bolts 69 to the base plate 70 of the cone. The outer edge of plate 70 is welded as at 71 to the lower edge of the cone. In the construction shown, the upper coupler carries the major weight load and centers the cone, while the lower coupler provides the driving connection and stabilizes the cone laterally. As shown in FIGURE 3, the base plate 70 includes a series of openings 72 located about the lower bracket 60 to facilitate assembly as indicated below.

At assembly of the cone, the upper coupler 58 preferably is attached to the top of the cone, then base plate 70 is welded in place with its lower coupler 60 attached. After the spider 50 is welded in place and the main shaft 46 installed, the cone may be slipped upon the upper portion of shaft 46, then centered by threading in the centering bolt 64. The two set screws 67 of the lower coupler are then tightened by reaching through the openings 72 of the base plate with a suitable tool.

As shown in FIGURE 2, the base of the cone comprises a vertical wall 73 concentric with the cylindrical chamber. When the machine is used for plucking chickens, as shown in the drawings, an annular rim 79 is welded to the base of the cone. The rim reduces the width of the discharge passageway to approximately one half inch as noted earlier. The purpose of the rim is to prevent the feet and other parts of the poultry from entering the discharge passageway. On the other hand, the passageway has sufficient width to allow the larger feathers to pass through without undue interference. It will be understood, that even though some of the feathers may hang up temporarily, the action of the flush streams, combined with the rotation of the cone, dislodges all feathers during the cycle.

When the machine is used for plucking turkeys, the annular rim 79 is omitted as indicated in FIGURES 5 and 6. This increases the width of passageway 17 to approximately three-quarters of an inch. The wider opening allows the larger outside feathers to be discharged without interference but prevents entry of the projecting parts of the fowl.

In the modified arrangement shown in FIGURE 7, the outside diameter of the picking cone base is slightly larger than the inside diameter of the chamber. To provide the annular discharge passageway indicated at 17a, the base is located in a plane spaced below the lower end of the chamber. The flushing water and feathers thus are discharged radially as indicated by the arrow. In this arrangement, the width of the annular pasageway may be regulated by adjusting the elevation of the cone relative to the end of the chamber to suit small and large poultry. For example, removable shims or washers (not shown) may be placed between the upper end of the main shaft 46 and socket of the upper coupler 58. To change the cone elevation, the cone is removed, or lifted slightly above the shaft for insertion or removal of the shims as required.

The fingers 13 and 18 of the cone and chamber may be generally of the type shown in Patent No. 2,683,282, to Robert W. McKinley et al., issued on July 13, 1954. Fingers of this type are known in the industry as manual picking fingers, being relatively stubby and having a greater bending resistance than the long flexible fingers used in the automatic picking machines. Each finger comprises a cylindrical shank 74 having a series of ribs 75 on its outer end portion which are delineated by circumferential grooves. Each finger has a tapered fillet near its base 76, with a narrow groove 77 between the fillet and base. The cone is provided with rows of holes 78 for mounting the fingers.

The fingers are installed in the cone by reaching through the openings 72 of the base plate and inserting each finger through its mounting hole. A pulling force is then exerted upon its outer end, which projects externally, causing the tapered fillet to contract then snap to expanded condition as it passes through the hole. The finger is thus anchored in the mounting hole with its base seated upon the internal surface of the cone. To facilitate mounting the fingers, a lubricant, such as a soap solution, may be applied to them.

The stationary fingers 13 of the chamber, which are similar, are mounted in the same way by passing their shanks through the four mounting holes 78 of the chamber, then pulling them outwardly.

After the machine has been in service for a prolonged period, the fingers may become worn and require replacement. The worn fingers are removed simply by forcing them inwardly from the exterior of the cone; the replacement fingers of the cone may be installed in the same manner through the openings 72 of the base plate without demounting the cone.

Figure 4:
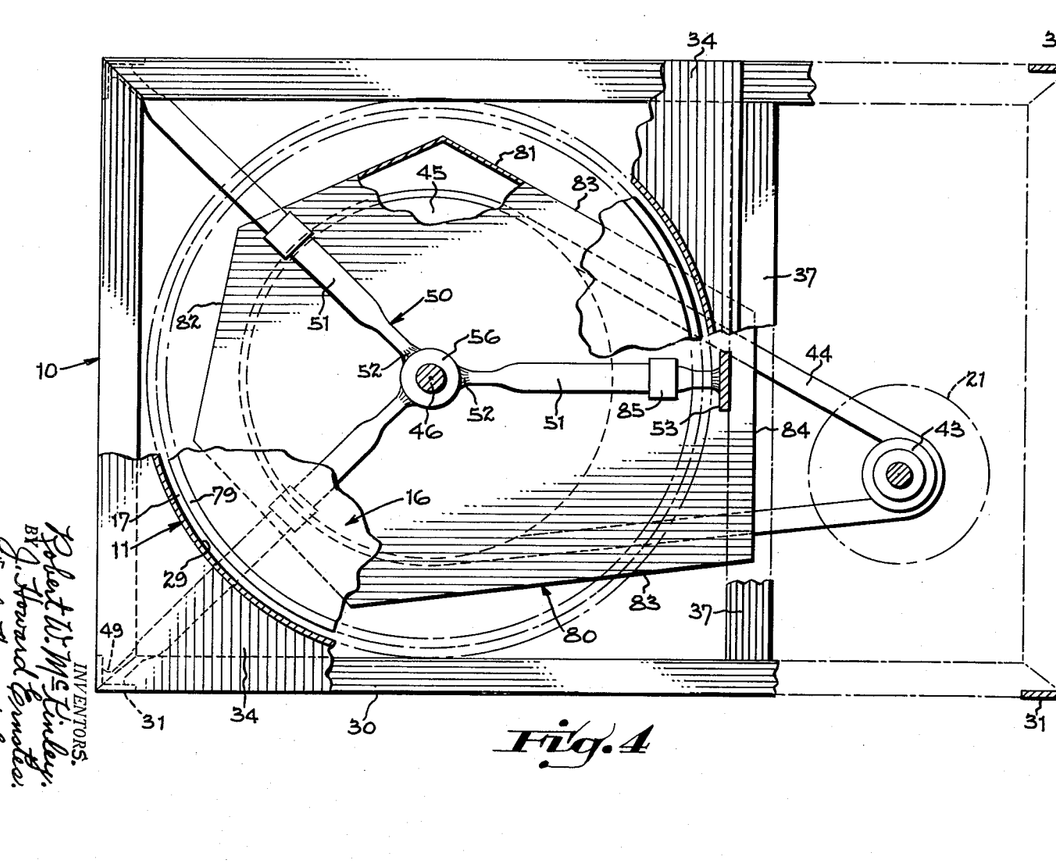
FIGURE 4 is a sectional view taken along line 4—4 of FIGURE 2.
Figure 5:
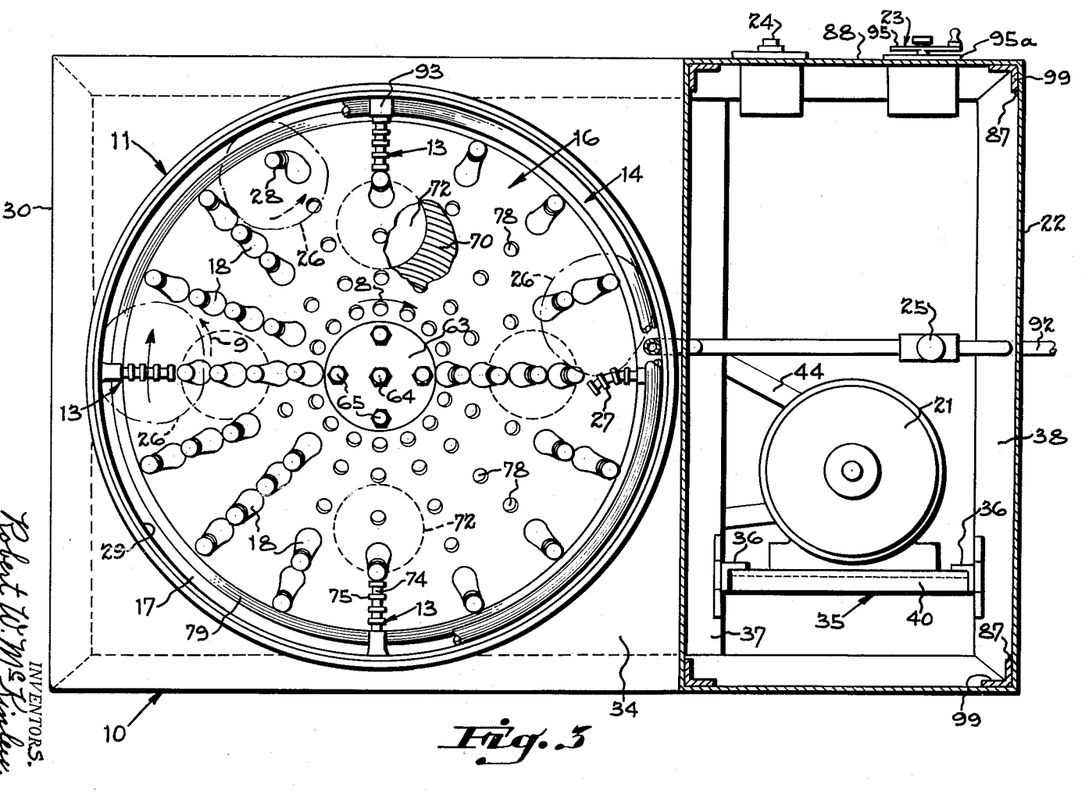

In order to protect the sheave 45 and V-belt 44 from the water and feathers discharging from the chamber, a shield 80, of elongated hexagonal shape, is mounted between the lower end of the chamber and sheave 45 (FIGURES 2 and 4). The shield is fabricated from sheet metal and includes a downwardly depending flange 81 which extends below the plane of the sheave and belts. The large end 82 of the shield completely overlies the driving sheave 45 and a converging portion 83 extends toward the motor sheave 43 and beneath the annular passageway 17, as indicated in broken lines in FIGURE 4. The side flanges 81 of the converging portion are parallel with and spaced outwardly from the V-belt runs so as to protect them from the portion of the discharge passageway under which they pass. The shield may be inclined slightly from the horizontal plane to facilitate drainage. The end of the shield adjacent the motor sheave is open as at 84 to provide clearance for the V-belts. Attachment clips 85 encircle the three arms 51 of the spider and have depending bracket portions 86 secured to the top of the shield. The three clips support the shield rigidly beneath the spider, with its bearing sleeve 48 projecting downwardly through the opening 89 of the shield.

The motor housing 22 includes an internal frame 99 formed of angle irons, and attached to the main frame by welding as at 87. As shown in FIGURE 1, the timer 23 and start button 24 are mounted upon the front wall 88 of the housing. The top panel 90 of the housing serves as a drain board or table for the supply of poultry which is charged into and discharged from the machine. For this purpose, it is inclined downwardly and outwardly from the chamber. A small deflector 91 is mounted upon the front wall 88 in a position to prevent any water from draining upon the timer. The housing also serves as a container for the electrical water control valve and other components and wiring of the control system. The top panel 90 preferably is detachably mounted so that it may be removed for access to the control system.

The flush water is introduced by way of the conduit 92 which is connected to the service line within the plant. After passing through the electric valve 25, the conduit extends through the wall of the housing and through the chamber into connection with the manifold 14. The manifold is attached by a series of clips 93 which are attached by screws 94 to the chamber. A series of small holes 108, located in the lower surface of the manifold, are arranged to project the jet streams of water downwardly and inwardly toward the surface of the chamber.

The timer includes an adjustable pointer 95 which may be rotated with reference to the graduations of an indicating plate 95a attached to the front wall 88. In its preferred form, the pointer is adjustable from a zero to a sixty second setting. The timer is a commercial product and its exact construction is not pertinent.

Referring to the circuit shown in FIGURE 8, the timer includes a switch 96 which is shown diagrammatically in the control circuit of the motor 21 and water supply valve 25. The motor and valve are powered by the supply line 97 and 98 and the control circuit is powered by the branch lines 100 and 101, leading to a relay 102, which regulates the power supply to the motor and water valve.

The circuit is shown in deenergized condition, with the timer switch 96 and start button 24 open. When the timer is set for the required treatment and the poultry is placed in the chamber, the start button 24 is depressed, thus energizing branch line 101 which leads to the winding of relay 102. As soon as the relay is energized, its normally open contactor 104 closes power line 97, and energizes the electrical valve and motor. The start button includes a third contact connected by line 105, the timer circuit being completed by line 106. When the start button is depressed, the timer is triggered to close its switch 96 and start timing the cycle.

Upon being energized, relay 102 also closes its holding contactor 107 and completes a holding circuit by way of branch line 109 to branch line 103 and through the normally closed stop button 110. The holding circuit keeps the motor and valve in operation so long as timer switch 96 remains closed.

At the end of the treatment period, the timer opens its switch 96 and deenergizes the relay, causing its contactors 104 and 107 to open. Accordingly, the motor is deenergized and the water valve is closed.

If it is desired to operate under manual control, or if it is necessary to stop the cone in mid-cycle, the stop button 110 is depressed. This opens the holding circuit (branch line 109) and deenergizes the relay even though the timer switch is still closed. As noted earlier, the timer is arranged to provide the same time period for which it is set each time the start button is depressed for the successive cycles of operation.

From the foregoing disclosure, it will be seen that the present machine has many worthwhile advantages over the apparatus heretofore in use by carrying forward the basic concept of the Hunt patent. As noted in the general statement of the invention, the Hunt manual picking machines require the operator to present each bird individually to the picking fingers, while the automatic machines require individual handling or feeding to and from the conveyor. The present invention, although simple in structure, takes advantage of the principles of these machines to defeather the birds in batches of 12 or more (depending upon the size of the machine) in a fraction of the time, thus multiplying the production rate many times. Moreover, the batch-type machine requires no attention on the part of the operator after it is loaded and put in operation; hence, the operator is free to perform other tasks, such as attending to the operation of the batch scalder.

Having described our invention, we claim:

1. A machine for stripping the feathers from a batch of poultry comprising, a generally upright cylindrical chamber adapted to loosely confine a batch of poultry, a generally cone-shaped feather stripping drum mounted for rotation within said chamber, a plurality of elongated flexible feather stripping elements projecting outwardly from the stripping drum toward the interior surface of the cylindrical chamber, said stripping elements being disposed at an angle with respect to the interior surface of the cylindrical chamber, said stripping elements having outer ends spaced inwardly from the interior surface of the cylindrical chamber and delineating a downwardly converging feather stripping zone, and flexible agitating elements residing in the chamber and projecting toward the flexible stripping elements of the rotating drum, the stripping elements having sufficient bending resistance to support the poultry and advance the same in an orbit within the chamber, said agitating elements residing in path of the advancing poultry and impeding said orbital motion, thereby causing the poultry to advance at a rate less than the stripping elements of the rotating drum, the interior surface of the cylindrical chamber providing a concentric backing surface which confines the poultry under pressure against the advancing stripping elements of the drum, said flexible stripping elements, yielding in the trailing direction in relation to the path of advancement thereof, the said flexible elements passing across the poultry under sufficient pressure to strip the feathers therefrom during rotation of the cone-shaped drum and flexible stripping elements.

2. A machine for stripping the feathers from a batch of poultry comprising, a cylindrical upright chamber, said chamber having an open lower end and adapted to confine a loose batch of poultry, a generally cone-shaped feather stripping drum mounted for rotation upon an upright axis generally coaxial with the axis of said chamber, a plurality of elongated flexible feather stripping elements mounted in spaced relationship on said cone-shaped drum, said stripping elements being disposed at an angle with respect to the interior surface of the cylindrical chamber, the said stripping elements and interior surface delineating an annular, downwardly converging feather stripping zone effective to support a batch of poultry in contact with the interior surface of the chamber and stripping elements, the cone-shaped drum having a lower end spaced inwardly from the open lower portion of the cylindrical chamber and delineating a restricted annular feather discharge passageway, and elongated poultry impeding means within the said converging stripping zone, the flexible stripping elements having sufficient bending resistance to support the poultry and advance the same in an orbit within the stripping zone during rotation of the drum, the said impeding means residing in a position to intercept the advancing poultry, thereby reducing the advancement thereof to less than the speed of advancement of the stripping elements, the wall of the chamber providing a concentric backing surface which confines the advancing poultry against the flexible stripping elements, the outwardly projecting portions of the stripping elements yielding in a trailing direction relative to the path of advancement thereof, the stripping elements passing across the surface of the poultry under sufficient pressure to strip the feathers therefrom during rotation of the drum and stripping fingers, said stripped feathers being discharged by gravity through the annular discharge passageway.

3. A machine for stripping the feathers from a batch of poultry comprising, a cylindrical upright chamber having a charging opening, said chamber adapted to confine scalded poultry in loose batch formation, an upright feather stripping drum mounted for rotation within the chamber upon an axis common to the axis of the cylindrical chamber, said drum having an external peripheral wall which slopes outwardly and downwardly from the axis of the drum toward the cylindrical chamber wall, a plurality of elongated flexible feather stripping elements mounted upon the sloping wall of the drum at spaced intervals, said stripping elements projecting outwardly from the drum wall upon axes which are generally normal to the sloping wall of the drum, said stripping elements being substantially equal in length and, in combination with the cylindrical chamber wall, delineating a downwardly converging annular feather stripping zone, whereby a batch of poultry charged into the chamber drops downwardly into the converging feather stripping zone for engagement between the stripping elements and periphery of the chamber, motor means connected to the feather picking drum for rotating the same relative to the chamber, said flexible feather stripping elements having sufficient bending resistance to support the poultry while advancing the same in an orbit within the annular stripping zone, said chamber wall providing a cylindrical backing surface confining the poultry in contact with the stripping elements, the outwardly projecting portions of the stripping elements yielding in a trailing direction relative to the path of advancement of the stripping elements, and flexible poultry impeding elements within said converging stripping zone, said impeding elements projecting toward said feather stripping zone and having outer ends disposed adjacent said stripping zone, said impeding elements located in the path of the poultry being advanced by said stripping elements, said impeding elements being spaced apart from one another about the periphery of the chamber and intercepting the advancing poultry intermittently, thereby imparting a tumbling motion to the poultry and causing the stripping elements to advance at a faster rate than the poultry, whereby the advancing stripping elements pass across the poultry under pressure and in diverse paths of motion with respect to the surfaces of the poultry and strip the feathers therefrom during rotation of the cone relative to the chamber.

4. A machine for stripping the feathers from batches of poultry of variegated size comprising, an upright cylindrical chamber having a charging opening, the chamber having an open lower end and adapted to confine loosely a batch of scalded poultry, a feather stripping cone mounted for rotation upon an axis common to the axis of the chamber, said stripping cone having a peripheral wall which slopes downwardly and outwardly from the central portion of the cone toward the base thereof, the base of the cone being concentric with the chamber, spaced inwardly therefrom and delineating an annular feather discharge passageway having a restricted width, a plurality of flexible feather stripping fingers mounted about the periphery of the cone and spaced apart from one another, the axes of the said fingers being generally normal to the sloping wall surface of the cone, said fingers being substantially uniform in length, said fingers being disposed at an angle with respect to the interior surface of said cylindrical chamber, said fingers having outer ends spaced inwardly therefrom, said fingers and chamber wall delineating an annular, downwardly converging feather stripping zone leading toward said annular discharge passageway, said converging feather stripping zone confining the poultry between the advancing flexible fingers and interior surface of the cylindrical chamber at an elevation which varies in accordance with the size of the birds of a batch, means connected to the cone for rotating the cone, said interior surface of the cylindrical chamber providing a concentric backing surface which holds the poultry in contact with the advancing flexible fingers of the cone, said fingers having sufficient bending resistance to yieldably support the poultry while advancing the same in an orbit, and tumbling means residing in the converging feather stripping zone in the plane of advancement of the poultry, said tumbling means impeding the orbital motion of the poultry and imparting to the birds a tumbling motion as a consequence to the impeding action, whereby the advancing fingers of the cone pass across the poultry under pressure in diverse paths and strip the feathers from all parts thereof during rotation of the cone.

5. A machine for stripping the feathers from batches of poultry of variegated size, comprising an upright cylindrical chamber having a charging opening, the chamber having an open lower end and adapted to confine loosely a batch of scaled poultry, a feather stripping cone mounted for rotation upon an axis common to the axis of the chamber, said stripping cone having a peripheral wall which slopes downwardly and outwardly from the central portion of the cone toward the base thereof, the base of the cone being concentric with the chamber, spaced inwardly therefrom, and delineating an annular feather discharge passageway having a restricted width, a plurality of flexible feather stripping fingers mounted about the periphery of the cone and spaced apart from one another, the axes of the said fingers being generally normal to the sloping wall surface of the cone, said fingers being substantially uniform in length, said fingers being disposed at an angle with respect to the interior surface of the cylindrical chamber and having outer ends spaced inwardly therefrom, said fingers and chamber interior surface of the delineating an annular, downwardly converging feather stripping zone leading toward said annular discharge passageway, said converging feather stripping zone confining the poultry between the advancing flexible fingers and interior surface of said chamber at an elevation which varies in accordance with the size of the birds of a batch, means connected to the cone for rotating the cone, the interior surface of the chamber providing a concentric backing surface which holds the poultry in contact with the advancing flexible fingers of the cone, said fingers having sufficient bending resistance to support the poultry while advancing the same in an orbit, tumbling means residing in the converging feather stripping zone in the plane of advancement of the poultry, said tumbling means impeding the orbital motion of the poultry and imparting to the birds a tumbling motion as a consequence to the impeding action, whereby the advancing fingers of the cone pass across the poultry under pressure in diverse paths and strip the feathers from all parts thereof during rotation of the cone, and manifold means for directing flush streams into the chamber, whereby the stripped feathers pass downwardly through the said annular discharge passageway.

6. In a machine for stripping the feathers from a batch of poultry, an upright cylindrical chamber adapted to confine loosely a batch of poultry, said chamber having a charging opening at its upper end and an open lower end, a feather stripping cone mounted for rotation within said chamber upon an axis common to the axis of the chamber, said cone comprising a wall which slopes downwardly and outwardly toward the lower open end of the chamber, the cone having a base which is spaced inwardly from the lower end of the chamber, the base of the cone and lower end of the chamber delineating an annular feather discharge passageway, a plurality of flexible stripping fingers spaced from one another and projecting outwardly from the cone along axes normal to the sloping surface thereof and radial to the axis of the cone, the fingers thereby being inclined upwardly at an angle with respect to the interior surface of the cylindrical chamber, the outer ends of said fingers being spaced inwardly from the interior surface of the chamber, said fingers and cylindrical chamber delineating an annular feather stripping zone which converges downwardly toward said annular discharge passageway, driving means connected to the cone for rotating the same, a plurality of poultry tumbling fingers mounted in spaced relation about the cylindrical chamber and projecting radially toward the outer ends of the stripping fingers of the cone, the advancing fingers of the cone adapted to engage a batch of poultry and advance the batch in an orbit within the stripping zone with the chamber confining the poultry against the flexible stripping fingers, the advancing stripping fingers, as a consequence of their upward inclination and flexibility imparting a rolling motion to the poultry confined between the fingers and chamber, the downward and outward slope of the cone wall and stripping fingers being sufficient to create a wedging action against the poultry, whereby the pressure of the stripping fingers against the poultry varies in relation to the size and weight of the poultry, said tumbling fingers being located in positions intermittently to impede the orbital advancement of the poultry and impart thereto a tumbling motion, the advancing stripping fingers thereby passing across the poultry under pressure and at a rate greater than the orbital advancement of the poultry to strip the feathers from the surfaces thereof during rotation of the cone.

7. In a machine for stripping the feathers from a batch of scaled poultry, an upright cylindrical chamber adapted to confine a loose batch of poultry, said chamber being of cylindrical shape and having open upper and lower ends, a feather stripping cone mounted within the chamber for rotation upon an axis common to the axis of the chamber, said cone having a peripheral wall which slopes downwardly and outwardly toward the interior surface of the chamber and a vertical cylindrical wall at the base thereof which depends downwardly from the lower edge of said sloping wall, said vertical wall being concentric with the interior surface of the chamber and spaced inwardly therefrom, thereby delineating an annular passageway at the base of the chamber, a rim projecting outwardly from said vertical wall at the base of the cone, the outer edge of said rim being concentric with said chamber wall, thereby delineating a restricted annular feather discharge passageway, a plurality of feather stripping fingers extending outwardly from the sloping surface of the cone in spaced relationship to one another about the periphery thereof, said fingers being disposed at an angle with respect to the interior surface of the cylindrical chamber, said stripping fingers and interior surface of the chamber delineating a downwardly converging feather stripping zone, a plurality of flexible tumbling fingers projecting inwardly from the chamber, a motor connected to the cone for rotating the same at sufficient speed to impel the batch of poultry outwardly against the wall of the chamber by centrifugal force and to advance the batch in an orbit, said stripping fingers being yieldable and having sufficient bending resistance to support the poultry while advancing the same in said orbit, said tumbling fingers located in positions to intercept and tumble said poultry while the stripping fingers advance across the poultry and strip the feathers therefrom, and means for supplying flush streams of water to the interior surface of the chamber for washing the stripped feathers from the poultry and interior surface of the chamber and for flushing the feathers through the said annular discharge passageway.

8. In a machine for stripping the feathers for a batch of poultry, a frame, a cylindrical chamber mounted in upright position upon said frame, said chamber having an open upper and lower end, a spider member mounted upon said frame beneath the lower open end of the chamber and residing in a generally horizontal plane, bearing means mounted upon said spider, a cone shaft rotatably journalled in the bearing means of the spider and projecting upwardly into the chamber, said shaft rotatable upon an axis common to the axis of the chamber, a driving system connected to the cone shaft at the lower end thereof for rotating the same, a feather stripping cone mounted upon the upper portion of said shaft for rotation therewith, a plurality of flexible stripping fingers projecting outwardly from said cone, said fingers being disposed at an angle with respect to the inside wall of the chamber, the outer ends of said fingers delineating a downwardly converging stripping zone concentric with the inside wall of the chamber, and a plurality of flexible tumbling fingers projecting from the inside wall of the chamber inwardly toward the stripping fingers of the cone, the said driving system advancing said cone and stripping fingers, the stripping fingers having sufficient bending resistance to support the poultry while advancing the same about the periphery of the chamber, said tumbling fingers having sufficient bending resistance to agitate and retard the advancement of the poultry, thereby causing the stripping fingers to advance across the surfaces of the poultry while the poultry is confined against the inside wall of the chamber to strip the feathers therefrom, the weight load of the drum and the impacts thereon during feather stripping action being carried by said cone shaft directly to the spider and frame of the machine.

9. In a machine for stripping the feathers from a batch of poultry, a frame, an upright cylindrical chamber mounted upon the frame, said chamber having open upper and lower ends and adapted to loosely confine a batch of poultry, a spider mounted upon the frame beneath the lower open end of the chamber and including a bearing element, a vertical shaft rotatably journalled in said bearing element and projecting upwardly into the chamber, said shaft being rotatable upon an axis common to the axis of the cylindrical chamber, a driving system connected to the lower end of said shaft below said spider for rotating the shaft, a feather stripping cone mounted upon the upper portion of the shaft and including a plurality of flexible fingers projecting at an angle with respect to the interior surface of the cylindrical chamber, a plurality of tumbling fingers mounted in the chamber and projecting inwardly toward the ends of the picking fingers of the cone, the lower end of the cone being spaced inwardly from the chamber and delineating a restricted annular discharge passageway, a water supply manifold mounted at the upper portion of the chamber adapted to project flow streams of liquid downwardly for flushing stripped feathers through the annular discharge passageway, and a shield element mounted between the spider and driving system, said shield element residing in a position intersecting the annular discharge passageway and protecting the driving system from the flush streams and feathers discharged from said passageway.

10. A machine for stripping the feathers from a batch of poultry comprising, an upright chamber having an interior cylindrical wall, said chamber adapted to confine scalded poultry in loose batch formation, a feather stripping element mounted for rotation within the chamber upon a vertical axis common to the axis of the chamber, a plurality of flexible feather stripping fingers mounted upon the said stripping element, said fingers projecting outwardly at an angle with respect to the interior cylindrical wall of the chamber, the outer ends of said fingers delineating a feather stripping plane which slopes downwardly and outwardly from the central portion of the said stripping element toward the said interior cylindrical wall, said fingers and chamber wall delineating an annular, downwardly converging feather stripping zone, and means connected to said drum for rotating the same, the batch of poultry being confined between the rotating fingers and interior cylindrical wall, the slope of the plane delineated by said fingers being sufficient to create a wedging action against the poultry in said zone, said fingers having sufficient bending resistance to support the poultry while advancing the same in an orbit within the annular stripping zone, the outwardly projecting portions of the fingers yielding in a trailing direction relative to the path of advancement thereof and passing across the surface of the poultry under sufficient pressure to strip the feathers, therefrom during rotation of the drum and stripping fingers.

11. A machine for stripping the feathers from a batch of poultry comprising, an upright chamber having an interior cylindrical wall, said chamber adapted to confine scalded poultry in loose batch formation, a feather stripping element mounted for rotation within the chamber upon a vertical axis common to the axis of the chamber, a plurality of flexible feather stripping fingers mounted upon said stripping element, said fingers projecting outwardly at an angle with respect to the interior cylindrical wall of the chamber, the outer ends of said fingers delineating a feather stripping plane which slopes downwardly and outwardly from the central portion of said stripping element toward the said interior cylindrical wall, said fingers and chamber wall delineating an annular, downwardly converging feather stripping zone, means connected to the feather stripping element for rotating the same, the batch of poultry being confined between the rotating fingers and interior cylindrical wall, the slope of the plane delineated by said fingers being sufficient to create a wedging action against the poultry in said zone, said flexible fingers having sufficient bending resistance to support the poultry while advancing the same in an orbit within the annular stripping zone, the outwardly projecting portions of the fingers yielding in a trailing direction relative to the path of advancement thereof, and a plurality of flexible tumbling fingers projecting inwardly from the wall of the interior cylindrical chamber into said annular stripipng zone, said tumbling fingers impeding the orbital motion of the poultry and imparting to the poultry a tumbling motion, whereby the advancing stripping fingers pass across the poultry under pressure in diverse paths and strip the feathers therefrom.

12. A poultry picking machine comprising a stationary cylindrical casing, a rotatable platform adjacent one end of said cylindrical casing, said platform having an upper broad surface facing the interior of said cylindrical casing, said platform upper surface being inclined with respect to the interior surface of said cylindrical casing, platform rotating means operatively connected to said platform for supporting and rotating the same, a plurality of resilient picking members mounted on and extending inwardly from a major portion of the interior surface of said cylindrical casing adjacent said platform, and a plurality of resilient picking members mounted on and extending from a major portion of said platform upper surface toward the interior of said cylindrical casing, said last-named picking members being disposed at an angle with respect to interior surface of said cylindrical casing.

References Cited in the file of this patent

UNITED STATES PATENTS

| | | |
|---|---|---|
| 686,576 | Blache | Nov. 12, 1901 |
| 745,658 | Perry et al. | Dec. 1, 1903 |
| 850,424 | Franklin et al. | Apr. 16, 1907 |
| 2,754,539 | Toti | July 17, 1956 |
| 2,777,158 | Pitts et al. | Jan. 15, 1957 |

FOREIGN PATENTS

| | | |
|---|---|---|
| 666,271 | Great Britain | Feb. 6, 1952 |